US012475797B2

(12) United States Patent
Koprulu

(10) Patent No.: US 12,475,797 B2
(45) Date of Patent: Nov. 18, 2025

(54) AIR TRAFFIC CONTROL SYSTEM

(71) Applicant: Oguz Mustafa Koprulu, Nevsehir (AR)

(72) Inventor: Oguz Mustafa Koprulu, Nevsehir (AR)

( * ) Notice: Subject to any disclaimer, the term of this patent is extended or adjusted under 35 U.S.C. 154(b) by 0 days.

(21) Appl. No.: 18/566,086

(22) PCT Filed: Jan. 26, 2023

(86) PCT No.: PCT/TR2023/050062
§ 371 (c)(1),
(2) Date: Dec. 1, 2023

(87) PCT Pub. No.: WO2024/049372
PCT Pub. Date: Mar. 7, 2024

(65) Prior Publication Data

US 2025/0118211 A1 Apr. 10, 2025

(30) Foreign Application Priority Data

Aug. 31, 2022 (TR) ............................... 2022/013628

(51) Int. Cl.

| | |
|---|---|
| ***G08G 5/25*** | (2025.01) |
| ***G08G 5/21*** | (2025.01) |
| ***G08G 5/23*** | (2025.01) |
| ***G08G 5/55*** | (2025.01) |
| ***G08G 5/80*** | (2025.01) |

(52) U.S. Cl.
CPC ................. *G08G 5/25* (2025.01); *G08G 5/21* (2025.01); *G08G 5/23* (2025.01); *G08G 5/55* (2025.01); *G08G 5/80* (2025.01)

(58) Field of Classification Search
CPC .. G08G 5/25; G08G 5/21; G08G 5/23; G08G 5/55; G08G 5/80; G08G 5/57; G08G 5/22; G08G 5/26; G08G 5/53; G08G 5/723
See application file for complete search history.

(56) References Cited

U.S. PATENT DOCUMENTS

| | | | | |
|---|---|---|---|---|
| 3,945,591 A * | 3/1976 | Cameron | B64B 1/58 | 244/31 |
| 5,149,015 A * | 9/1992 | Davis | B64B 1/40 | 244/96 |
| 8,434,711 B2 * | 5/2013 | Berman | F41H 11/04 | 244/33 |
| 9,290,258 B1 | 3/2016 | DeVaul | | |
| 9,327,816 B1 | 5/2016 | Mathe et al. | | |
| 2013/0175387 A1 | 7/2013 | DeVaul et al. | | |
| 2020/0036434 A1 | 1/2020 | Van Wynsberghe | | |

FOREIGN PATENT DOCUMENTS

| | | | |
|---|---|---|---|
| CN | 102442419 B * | 10/2014 | |
| CN | 114115010 A | 3/2022 | |
| GB | 2468649 A * | 9/2010 | G09F 21/08 |
| KR | 102577562 B1 * | 9/2023 | G01C 21/34 |
| WO | 2017059545 A1 | 4/2017 | |

* cited by examiner

*Primary Examiner* — Mary Cheung
(74) *Attorney, Agent, or Firm* — Bayramoglu Law Offices LLC

(57) ABSTRACT

An air traffic control system for providing air traffic control of a group of balloons having at least two hot air balloons, each having at least one position sensing unit, including at least one hot air balloon navigation unit.

5 Claims, 2 Drawing Sheets

AIR TRAFFIC CONTROL SYSTEM

CROSS REFERENCE TO RELATED APPLICATIONS

This application is a national stage entry of International Application No. PCT/TR2023/050062, filed on Jan. 26, 2023, which is based upon and claims foreign priority to Turkey Patent Application No. 2022/013628, filed on Aug. 31, 2022, the entire contents of which are incorporated herein by reference.

TECHNICAL FIELD

The invention relates to an air traffic control system for providing air traffic control of a group of balloons having at least two hot air balloons, each having at least one position sensing unit, including at least one hot air balloon navigation unit.

BACKGROUND

Hot air balloons fly in large numbers in a restricted areas and carry many passengers. Air traffic control of hot air balloons is essential to prevent accidents.

In the present technique, traffic control is carried out by hot air balloon pilots, and the pilots can be informed via a ground unit. However, the high volume of the balloons limits the angle and field of view of the pilots. Therefore, the workload of the pilots increases significantly, and the increased load creates the risk of an accident. Pilots make use of various avionic systems from the hot air balloon to minimize the risk of an accident. In cases where these avionic systems alone are not sufficient, the pilots exchange information among themselves and with the observer team on the ground via radios. Although pilots provide information flow from various sources, situations such as the flight route being directly dependent on the human factor increase the risk of accidents.

The application numbered CN114115010A discloses that various avionic systems are used to control the flight of an unmanned hot air balloon.

As a result, all the above-mentioned problems have made it necessary to make an innovation in the relevant technical field.

SUMMARY

The present invention is related to an air traffic control system in order to eliminate the above-mentioned disadvantages and bring new advantages to the related technical field.

An object of the invention is to present an air traffic control system in which everyone can control various data such as registration number, altitude, and volume of a hot air balloon group with at least two hot air balloons, thus reducing the risk of an accident.

Another purpose of the invention is to provide a safe environment for the passengers in the hot air balloon.

In order to achieve all the above-mentioned objectives and the ones that will emerge from the detailed description below, the present invention is an air traffic control system for providing air traffic control of a group of balloons having at least two hot air balloons, each having at least one position sensing unit, including at least one hot air balloon navigation unit. The innovation of the invention lies in that the navigation unit comprises a sensor unit that contains at least one height determination module for determining height; a processing unit; a balloon position information containing the balloon identification number registered in a memory unit, and a communication unit configured to broadcast a balloon information containing the position information of a balloon obtained by the position sensing unit and a height information obtained by said height determination module by any of the wireless communication methods and to receive the broadcasts made by other balloons and transmit them to the processor unit; the processor unit being configured to determine the positions and of the balloons according to the balloon information it receives, and to mark the position of each balloon on a map in real time according to the determined positions and heights, to show the size of the balloons on the map according to the mentioned characteristics, and to display this map on a user interface; the mentioned air traffic control system comprising a traffic control unit having a traffic control communication unit that receives the balloon information broadcast by the balloons; the traffic control unit being configured to create a map according to the balloon information and balloon information received from the balloons and display it in a traffic control user interface; in the event that the balloons on the map detect a predetermined danger condition according to their location, the traffic control unit being configured to send a warning signal to the navigation unit of at least one of the balloons involved in the mentioned danger condition. Thereby, a flight where the risk of accident is minimized is ensured by the pilots displaying the location of the other balloons on a single screen and planning their flight accordingly.

A possible embodiment of the invention is characterized in that the balloon information collected by the communication unit is sent to a server in real-time by the traffic control unit. Thereby, the transferred data can be observed instantly, and air traffic control is carried out in a healthy way.

Another possible embodiment of the invention is characterized in that it comprises at least one image capture unit. Thereby, the safety of the passengers in the basket is constantly monitored and a safe flight environment is provided for the passengers.

Another possible embodiment of the invention is characterized in that it comprises at least one flight registration unit. Thus, all data related to the flight are recorded in case of a possible accident, and it is ensured that all data are examined in a healthy manner.

REFERENCE NUMBERS GIVEN IN THE FIGURES

Figure 1:
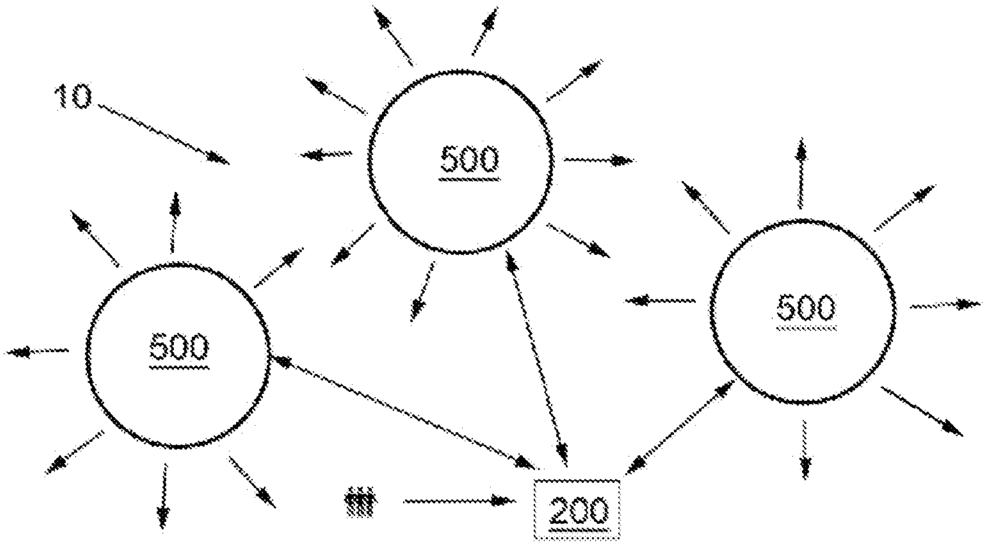
FIG. 1 shows a representative view of the flight air traffic control unit.

10 Flight Air Traffic Control Unit
100 Navigation Unit
110 Processor Unit
120 Memory Unit
121 Balloon identification information
122 Balloon information
130 User interface
140 Sensor Unit
141 Position sensing unit
142 Height detection unit

150 Communication Unit
151 Signal Receiver Unit
152 Signal Transmitter Unit
160 Warning Unit
200 Traffic Control Unit
210 Traffic Control Communication Unit
220 Traffic Control Memory Unit
230 Traffic Control Processor Unit
240 Traffic Control User interface
250 Mobile Terminal
300 Server Unit
400 User Terminals
500 Hot Air Balloon
510 Image Capture Unit
520 Flight Registration Unit.

DETAILED DESCRIPTION OF THE EMBODIMENTS

In this detailed description, the subject matter of the invention is explained only by means of examples that will not have any limiting effect for a better understanding of the subject matter.

The invention is related to an air traffic control system for providing air traffic control of a group of balloons comprising at least one hot air balloon (500) navigation unit (100) and at least two hot air balloons (500) having various avionic systems together with at least one position sensing unit (141).

FIG. 1 shows a balloon group containing multiple hot air balloons (500) and a traffic control unit (200). Hot air balloons (500) broadcast information called balloon information (122), the details of which to be explained below, and receive broadcasts from other balloons; the traffic control unit (200), on the other hand, receives the broadcast containing this information from all balloons and provides traffic control accordingly.

Figure 2:
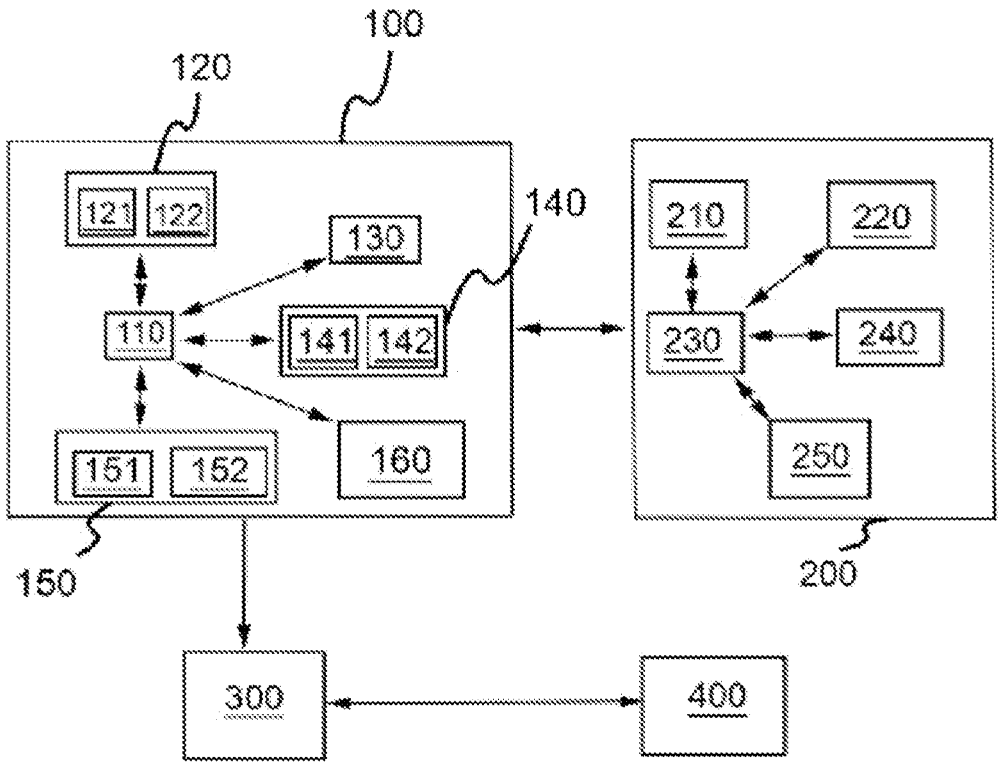
FIG. 2 shows a representative view of the traffic control unit, server unit, and user terminals.
Figure 3:
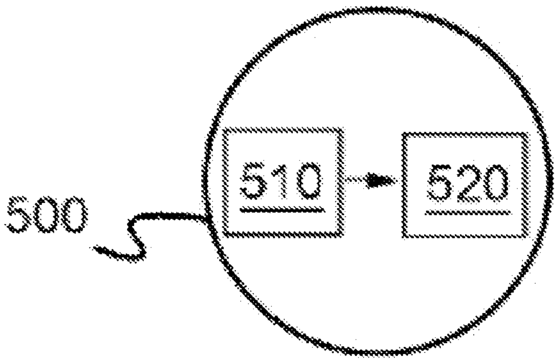
FIG. 3 shows a representative view of the hot air balloon.

Referring to FIG. 2, in more detail, each hot air balloon (500) comprises a navigation unit (100). The navigation unit (100) includes a sensor unit (140) that obtains data regarding the position of the hot air balloon (500). The sensor unit (140) includes a position sensing unit (141) that detects the global position of the balloon. The position sensing unit (141) may be a GPS module or a GLONASS module. The sensor (140) unit comprises a height-sensing unit that detects the height of the balloon. The height sensing unit may be an altimeter.

The navigation unit (100) includes a memory unit (120) in which the position information and altitude information obtained by the sensor unit (140) is recorded. The memory unit (120) may also contain balloon identification information (121). The balloon identification information (121) can be a registration number or other distinguishing mark. The memory unit (120) may also comprise balloon features that match the balloon identification information (121). The mentioned balloon characteristics may comprise the model, volume, diameter, carrying capacity of the balloon, etc. Balloon identification information (121), position information, and height information are defined as balloon information (122) together.

The navigation unit (100) comprises a communication unit (150) that broadcasts balloon information (122) and receives balloon information (122) broadcast from communication units (150) of other balloons. The communication unit (150) may also be configured to exchange messages with other external devices. A signal receiver and a signal transmitter in the communication unit (150) broadcast balloon information (122) which is collected by the sensor unit (140) from the balloon in which they are placed and kept in the memory unit (120), by any of the wireless communication methods. These wireless communication methods can be Bluetooth, Wi-Fi, ZigBee, GSM, and RFID. Each hot air balloon (500) receives the balloon information (122) by sensing the broadcast of the other via the signal transmitter unit (152) with the signal receiver unit (151).

There is a processor unit (110) inside the navigation unit (100). The processor unit (110) determines the location, height, and properties of the balloons according to the balloon information (122) it receives. It marks the position of each balloon on a map in real-time according to the detected location, height, and property, and determines the size of the balloon on the map according to its characteristics. All data processed by the processor unit (110) is transmitted to a user interface (130) so that the user can see it on a map. The user interface (130) may be a screen. The mentioned map is a virtual map and can scale the region, and the balloons on the same are shown at scale according to their features.

Referring to FIG. 2, a traffic control unit (200) transmits the information received by the communication unit (150) and the balloon information (122) that the processor unit (110) receives from all balloons to a traffic control processor unit (230) via a traffic control communication unit (210). The traffic control processor unit (230) creates a map according to all balloon information (122) received and evaluated, similar to what the processor unit (110) in the navigation unit (100) does and ensures that it is transferred to a traffic control user interface (240).

The traffic control processor unit (230) can evaluate the information it receives with a mathematical model or machine learning methods and detect the dangerous situations that meet the predetermined conditions. Danger situations, such as balloons approaching each other, the intersection of the routes drawn by the balloons, etc. may occur. When the traffic control processor unit (230) detects a situation that may risk air traffic from the data it evaluates, it sends a warning message to the warning units of the balloons (160) via a mobile terminal (250) from a different channel.

The balloon information (122) received by said traffic control communication unit (210) is stored in a traffic control memory unit (220). Said traffic control unit (200) transmits the data it receives from the navigation unit (100) to a server unit (300) in real-time. The real-time transmitted data coming to the server unit (300) is accessed via a user terminal (400). The data is transmitted uninterruptedly by any of the wireless communication methods. These wireless communication methods can be Bluetooth, Wi-Fi, ZigBee, GSM, and RFID.

All information such as the position, height, and volume of all hot air balloons (500) transmitted by wireless communication methods are displayed on the screen of the user and the pilot of the hot air balloon (500).

In addition, an image capture unit (510) in the hot air balloon (500) takes video and sound recordings to ensure the safety of the balloon during flight. The image capture unit (510) may include a camera and a microphone.

The information recorded by the image capture unit (510) and all avionic data of the balloon collected during the flight is kept in a flight registration unit (520). The flight registration unit (520) ensures that the data needed by the teams investigating the incident can be safely obtained in the event of a possible accident.

An exemplary embodiment of the invention is explained as follows;

When the hot air balloon group (500) with at least two hot air balloons (500) takes off for flight, the hot air balloons (500) communicate with each other with the traffic control unit (200). Balloon information (122) collected by the navigation unit (100), position sensing unit (141), and height detection unit (142) located in the sensor unit (140) is transmitted to the processor unit (110).

In addition, balloon identification information (121) and balloon information (122) in the memory unit (120) are also transmitted to the processor unit (110). The processor unit (110) transmits the data collected by the sensor unit (140) and the data received from the memory unit (120) to the communication unit (150). The communication unit (150) ensures that the information coming from the processor unit (110) is broadcast to other hot air balloons (500) by means of the signal transmitter unit (152). The broadcast made by other hot air balloons (500) is detected by the signal receiver unit (151) located in the communication unit (150). Thereby, mutual information exchange is provided between the hot air balloons (500).

The processor unit (110) creates a map by compiling the information it receives from other hot air balloons (500). The created map is transmitted to the user interface (130) by the processor unit (110). The user interface (130) may be a screen. In the user interface (130), the pilots of the hot air balloon (500) can see the volume, altitude, and position of the other balloons. In this way, the pilots provide the necessary controls on the map.

The data collected by the navigation unit (100) is transmitted to the traffic control unit (200). The traffic control processor unit (230) evaluates the data it receives. These evaluated data are instantly stored in the traffic control memory unit (220). While the traffic control memory unit (220) evaluates the incoming data, it also ensures that these data are sent to the traffic control user interface (240). As a result of the evaluation of these instantaneously sent data, when the risk of an accident may arise, a warning message is sent via the mobile terminal (250) to the warning units (160) of the balloons that carry the risk of accident through different channels.

Along with the data transmitted by the navigation unit (100) to the server unit (300), the server unit (300) provides access to the instantly transmitted information via user terminals (400). Thus, uninterrupted communication between hot air balloons (500) and between hot air balloons (500) and the traffic control unit (200) is ensured both uninterruptedly and backed up to prevent data loss.

The image capture unit (510) in the hot air balloon (500) keeps records during the flight. The image capture unit (510) checks that the flight is safe or that no element endangers the safety. In case of a dangerous situation, all the data obtained is kept in the flight registration unit (520) for review and to enable the examination of the data provided by the hot air balloon (500) avionics systems.

The protection scope of the invention is specified in the appended claims and cannot be strictly limited to what has been described in this detailed description for illustrative purposes. It is clear that those skilled in the art can put forth similar embodiments in the light of the foregoing, without departing from the main theme of the invention.

The invention claimed is:

1. Air traffic control system for providing air traffic control of a group of balloons with at least two hot air balloons, each with at least one position sensing unit module, including at least one hot air balloon navigation unit, characterized in that;

the navigation unit comprises a sensor unit that contains at least one height determination module for determining height, and a processing unit;

a balloon position information containing the balloon identification number registered in a memory unit, and a communication unit configured to broadcast a balloon information containing the position information of a balloon obtained by the position sensing unit and a height information obtained by said height determination module by any of the wireless communication methods and to receive the broadcasts made by other balloons and transmit them to the processor unit;

the processor unit is configured to determine the positions of the balloons according to the balloon information it receives, and to mark the position of each balloon on a map in real time according to the determined positions and heights, to show the size of the balloons on the map according to characteristics, and to display this map on a user interface;

the air traffic control system comprises a traffic control unit having a traffic control communication unit that receives the balloon information broadcast by the balloons;

the traffic control unit is configured to create a map according to the balloon information and balloon information received from the balloons and display it in a traffic control user interface; and the traffic control unit is configured to send a warning signal to the navigation unit of at least one of the balloons involved in the hazard condition in case the traffic control unit detects a predetermined hazard condition based on the positions of the balloons on the map.

2. The air traffic control system according to claim 1, further comprising; a server to which the balloon information collected by the communication unit is sent in real-time by the traffic control unit.

3. The air traffic control system according to claim 1, further comprising; at least one image capture unit.

4. The air traffic control system according to claim 1, further comprising; the image capture unit comprises a camera and a microphone.

5. The air traffic control system according to claim 4, further comprising; at least one flight recording unit in which each balloon stores balloon information received from the other balloon, the balloon's own balloon information, images received from the camera, and audio data received from the microphone.

* * * * *